(12) United States Patent
Dumoutier et al.

(10) Patent No.: US 10,295,278 B2
(45) Date of Patent: May 21, 2019

(54) HEADER BOX, HEAT EXCHANGER COMPRISING SAID HEADER BOX AND METHOD OF CRIMPING SUCH A BOX

(75) Inventors: Mickael Dumoutier, Betheniville (FR); Laurent Moreau, Reims (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 606 days.

(21) Appl. No.: 14/122,285

(22) PCT Filed: May 22, 2012

(86) PCT No.: PCT/EP2012/059465
§ 371 (c)(1),
(2), (4) Date: Apr. 18, 2014

(87) PCT Pub. No.: WO2012/160054
PCT Pub. Date: Nov. 29, 2012

(65) Prior Publication Data
US 2014/0299301 A1    Oct. 9, 2014

(30) Foreign Application Priority Data
May 26, 2011 (FR) ...................... 11 54576

(51) Int. Cl.
*F28F 9/02*     (2006.01)
*B23P 15/26*    (2006.01)

(52) U.S. Cl.
CPC ............. *F28F 9/02* (2013.01); *B23P 15/26* (2013.01); *F28F 9/0224* (2013.01); *F28F 2275/122* (2013.01); *Y10T 29/49389* (2015.01)

(58) Field of Classification Search
CPC .... F28F 9/02; F28F 2009/0285; F28F 9/0224; F28F 9/0219; F28F 2275/122; B23P 15/26; Y10T 29/49389
(Continued)

(56) References Cited

U.S. PATENT DOCUMENTS 3,499,484 A * 3/1970 Lanzoni ............... F28D 7/04
                                             165/159
4,351,390 A * 9/1982 Argyle ............... F28F 9/0226
                                             165/149
(Continued)

FOREIGN PATENT DOCUMENTS

DE    4232018 A1    3/1994
FR    2954482 A1 *  6/2011   ........... F28D 7/1684
(Continued)

OTHER PUBLICATIONS

English language abstract and machine translation for DE 4232018, extracted from espacenet.com databae on May 14, 2014, 31 pages.
(Continued)

*Primary Examiner* — Claire E Rojohn, III
(74) *Attorney, Agent, or Firm* — Howard & Howard Attorneys PLLC

(57) ABSTRACT

A header box (3') includes a header (10) and a cover (11) having a longitudinal extent dimension and at least one flange (8') crimped in-between the header (10) and the cover (11). The header (10) has a ductility different from that of the flange (8'). At the flange (8'), a longitudinal portion (18) of the header (10) and/or of the flange (8') is rolled in such a way that the flange (8') is trapped between the header (10) and the cover (11). Additionally, a heat exchanger includes such a box.

8 Claims, 3 Drawing Sheets

(58) Field of Classification Search
USPC .................................. 165/158, 172, 173, 175
See application file for complete search history.

(56) References Cited

U.S. PATENT DOCUMENTS

| | | | | |
|---|---|---|---|---|
| 4,896,718 | A * | 1/1990 | Trin ...................... | F28F 9/0234 123/41.33 |
| 4,917,180 | A * | 4/1990 | Wolf .................... | F28D 1/05375 165/150 |
| 5,107,926 | A * | 4/1992 | Calleson ............. | F28D 1/05383 165/153 |
| 5,186,246 | A * | 2/1993 | Halstead .............. | B60H 1/3227 165/140 |
| 5,186,248 | A * | 2/1993 | Halstead .............. | B60H 1/3227 165/153 |
| 5,195,579 | A * | 3/1993 | Buchanan ............. | F28F 9/0224 165/149 |
| 5,226,490 | A * | 7/1993 | Ryan ....................... | F28F 9/182 165/173 |
| 5,289,873 | A * | 3/1994 | Ryan ..................... | F28F 9/0224 165/149 |
| 5,570,737 | A * | 11/1996 | Tokutake .............. | F28D 1/0535 165/67 |
| 5,727,626 | A * | 3/1998 | Kato ..................... | F28F 9/0212 165/153 |
| 6,115,918 | A * | 9/2000 | Kent ..................... | F28F 9/0212 165/173 |
| 6,293,011 | B1 * | 9/2001 | Hasegawa ............ | B23K 1/0012 29/890.052 |
| 9,239,196 | B2 * | 1/2016 | Ghiani ...................... | F28F 9/00 |
| 2002/0057941 | A1 * | 5/2002 | Nakajima ............... | F16L 41/00 403/230 |
| 2005/0006079 | A1 * | 1/2005 | Ishii ...................... | B21D 53/085 165/173 |
| 2006/0006642 | A1 * | 1/2006 | Getto .................... | F28F 9/0246 285/189 |
| 2006/0118289 | A1 * | 6/2006 | Jung .................... | B60H 1/00328 165/178 |
| 2009/0095458 | A1 * | 4/2009 | Lim ........................ | F28F 9/0224 165/174 |
| 2009/0255657 | A1 * | 10/2009 | Hakamata ................ | B23P 15/26 165/178 |
| 2010/0025028 | A1 * | 2/2010 | Shinhama ................ | F25B 39/04 165/174 |
| 2010/0083694 | A1 * | 4/2010 | Takagi .................. | F25B 39/022 62/515 |
| 2013/0000876 | A1 | 1/2013 | Lavenu et al. | |
| 2013/0175013 | A1 * | 7/2013 | Yoshioka ............. | B23K 1/0012 165/151 |
| 2013/0192803 | A1 * | 8/2013 | Garret ................... | F28D 7/1684 165/151 |
| 2013/0319644 | A1 * | 12/2013 | Moreau ................. | F28F 9/0224 165/173 |
| 2016/0146548 | A1 * | 5/2016 | Durbecq ............... | F28F 9/0224 165/178 |

FOREIGN PATENT DOCUMENTS

| | | | | | |
|---|---|---|---|---|---|
| JP | WO 2012043565 | A1 * | 4/2012 | .......... | B23K 1/0012 |
| WO | WO 2011048050 | A1 * | 4/2011 | ............. | F28F 9/002 |

OTHER PUBLICATIONS

English language abstract for WO 2011/048050, extracted from espacenet.com database on May 14, 2014, 26 pages. Also see English equivalent US 2013/0000876.

International Search Report for PCT/EP2012/059465 dated Aug. 7, 2012, 5 pages.

* cited by examiner

HEADER BOX, HEAT EXCHANGER COMPRISING SAID HEADER BOX AND METHOD OF CRIMPING SUCH A BOX

RELATED APPLICATIONS

This application is the National Stage of International Patent Application No. PCT/EP2012/059465, filed on May 22, 2012, which claims priority to and all the advantages of French Patent Application No. FR 11/54576, filed on May 26, 2011, the content of which is incorporated herein by reference.

The invention relates to a manifold comprising a collector, a cover and at least one flange, a heat exchanger comprising the said manifold and a method for crimping a manifold of this type.

The invention applies to any type of heat exchanger, in particular for a motor vehicle, such as, for example, heat exchangers of air-conditioning loops.

In this field, exchangers are known comprising a bundle of tubes arranged parallel to one another on one or a plurality of rows which are parallel to one another, these tubes being designed to transport a coolant fluid, whilst air flows between the tubes and exchanges heat with the coolant fluid.

The tubes are connected to manifolds via passage orifices, i.e. an input manifold and an output manifold. The coolant fluid flows in the tubes from the input manifold to the output manifold.

The manifolds comprise a collector with a wall which is open longitudinally and a cover which closes the collector, after brazing. In order to preassemble the cover and the collector before brazing, it is known to crimp them. For this purpose the collectors have lateral wings, part of which is crimped around the cover in order to close the manifold.

Fluid connection flanges are added onto these manifolds, with entry into the input manifold and exit from the output manifold. They allow the fluid to enter and exit the exchanger.

Other flanges can also be added onto the manifolds, such as, for example, flanges which are designed for securing of the exchanger onto appropriate supports of the vehicle, and/or are designed for fastening of a fluid storage bottle which is in fluid communication with one of the collectors.

During the pre-assembly of the collector and the cover, part of the flanges is also crimped between the part of the collector and the cover.

It is known to use two different types of punches in order to carry out the crimping operation. Since the crimped part of the flange has a thickness which is not zero, the first punch which is used to crimp the part of the collector onto the part of the flange which is crimped onto the cover has an open angle. On the other hand the second punch has an angle which is more closed, thus making it possible to bend the remainder of the collector back more, and therefore to crimp it onto the cover, such that the assembly is correctly blocked before the brazing.

A disadvantage of this method is the use of two different punches in order to carry out a single crimping operation. In fact, it is necessary to position the punches according to the number and position of the flanges present on the manifold. It is therefore necessary to carry out regularly punch change operations according to the exchanger model in production, which generates losses of time and therefore of productivity.

The object of the invention is to eliminate the aforementioned problem.

For this purpose it proposes a manifold comprising a collector and a cover with a dimension with longitudinal extension and at least one flange crimped between the collector and the cover.

According to the invention:
- the collector has ductility which differs from that of the flange;
- at the level of the said flange, a longitudinal portion of the collector and/or of the flange is rolled such that the flange is blocked between the collector and the cover.

The invention thus consists of designing a manifold wherein a longitudinal portion of the collector and/or of the flange is rolled, i.e. the collector and/or the flange are deformed locally, and in particular flattened and/or compressed. According to the invention, there is therefore partial elimination of the excess thickness of material due to the flange during its crimping, thus facilitating the simultaneous crimping of the remainder of the collector and of the cover.

Thus, by means of the invention, it is possible to use a single punch profile in order to crimp the collector onto the flange(s) and onto the cover, since the reduced thickness of the longitudinal portion of the collector and/or of the flange will facilitate blocking of the collector and the cover also where there is no flange.

According to an aspect of the invention, the collector has the said rolled longitudinal portion blocking the flange, and a longitudinal portion which defines the remainder of the length of the collector, known as the remaining longitudinal portion, and the cover is blocked by the remaining longitudinal portion of the collector. According to this aspect of the invention, it is the collector which has the greatest ductility, and the said rolled longitudinal portion has a thickness smaller than the remainder of the collector which is not rolled.

According to an aspect of the invention, the longitudinal portion of the collector which blocks the flange and the remaining longitudinal portion of the collector have the same inclination, at least at the level of a surface opposite a surface facing the cover and/or the flange. This inclination makes it possible both for the collector to block the flange, and, at the locations without flanges, to block the cover by taking advantage of the fact that the said longitudinal portion which blocks the flange is rolled.

According to one embodiment, the longitudinal portion of the collector which blocks the flange is rolled towards the flange, in particular towards a part of the flange which forms a body comprising the functional part of the flange (fastening and/or circulation of fluid).

Advantageously, the flange has a foot part against which the collector is rolled, and is for example connected to the body. This foot part extends for example over a distance less than 40 mm, and in particular over a distance equal to 20 mm, according to the said dimension with longitudinal extension.

According to an aspect of the invention, the collector has lateral wings which are rolled against the foot part of the flange.

According to one embodiment, the lateral wings have a free longitudinal edge with an initial thickness which is smaller than the remainder of the lateral wings of the collector.

The invention also relates to a heat exchanger provided with a manifold as previously defined.

The invention also relates to a method for crimping a manifold, comprising a collector and a cover with a dimension with longitudinal extension and at least one flange.

According to this method, the flange is crimped between the collector and the cover, and the collector is crimped onto the cover, using a single punch profile, such that, in a single operation, the flange is blocked between the collector and the cover, and the cover is blocked by the collector, by rolling a longitudinal part of the collector and/or of the flange.

By means of the invention, a single punch profile is used for the crimping of the collector, the flanges and the cover, thus avoiding changes of punch profiles according to the model of the manifold to be crimped, and this therefore improves the productivity of a crimping operation of this type.

According to a variant of the invention, since the ductility of the collector is greater than that of the flange, the said collector is rolled.

The appended figures will make it apparent how the invention can be implemented. In these figures, identical references designate similar elements.

Figure 1:
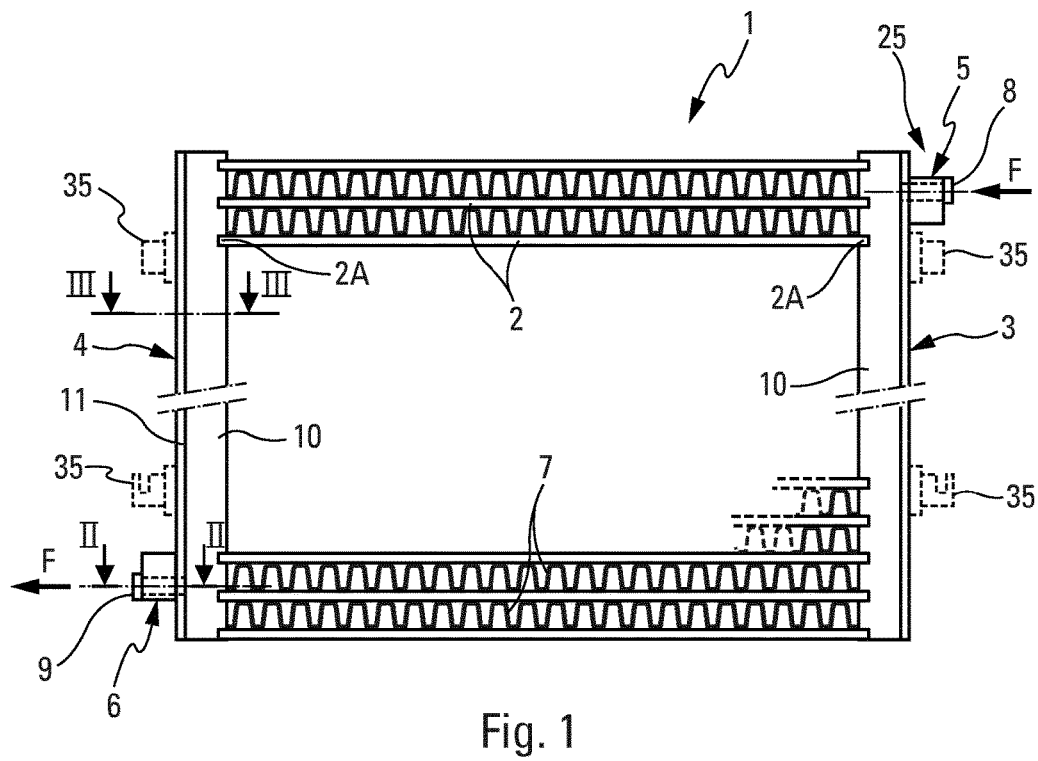
FIG. 1 is a schematic plan view of an embodiment of a heat exchanger comprising a manifold according to the invention.

The application of the invention is for example in a heat exchanger as represented in FIG. 1. This exchanger is in particular a condenser of an air-conditioning loop of the interior of a vehicle.

The heat exchanger 1 can comprise a bundle of parallel tubes 2, the ends 2A of which are connected in a fixed and sealed manner to manifolds, respectively for input 3 and output 4, according to the direction of circulation F of a coolant fluid which circulates in the tubes 2. These input 3 and output 4 manifolds comprise input 5 and output 6 flanges, which themselves are connected to input 8 and output 9 connections, which are fitted onto connection pieces, and allow the fluid to go round a circulation loop.

In particular, the tubes 2 in which the fluid circulates have a flattened transverse cross section, and between them there are provided guides 7 which increase the heat exchange surface between the fluid which circulates in the exchanger 1 and the flow of external air which passes through the latter. The interior of the tubes 2 can also include agitators which, like the guides 7, increase the heat exchange surface and the mechanical strength of the tubes. These can also be extruded tubes. Each tube defines for example a plurality of parallel inner channels for circulation of fluid.

The manifolds 3, 4 can comprise other flanges 35 which are designed for securing of the exchanger 1 onto appropriate supports of the vehicle and/or for the fastening of a fluid storage bottle which is in fluid communication with one of the manifolds.

The aforementioned different elements which the heat exchanger 1 comprises are in particular brazed to one another.

Figure 2:
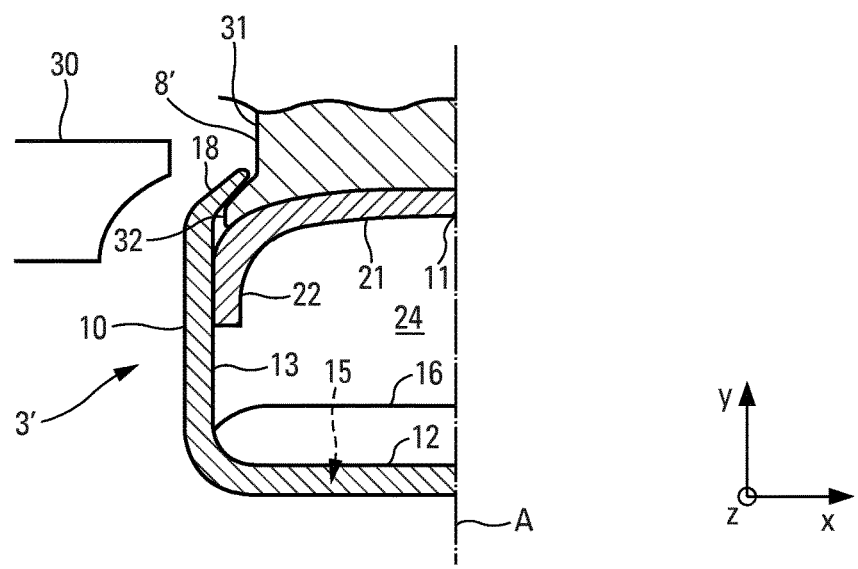
FIG. 2 is a transverse cross section of the manifold after crimping of the collector onto the flange, according to the line II-II in FIG. 1.

A manifold according to the invention is represented in greater detail in FIG. 2. This can equally be an input 3 and/or output 4 manifold, since they are globally identical, and hereinafter in the description they will be known as the manifold 3'. By convention, and in order to simplify the description of the manifold 3' according to the invention, a Cartesian reference is formed (o, x, y, z), and the direction o-x is defined as being the direction of the width of the manifold 3', o-y is the direction of the height, and o-z is the direction of the length.

It should be noted that FIGS. 2 to 4, 6, 7a and 7b represent a manifold 3' in cross section according to an axis of symmetry A parallel to the direction o-y. The continuation of the description concerning these Figures will therefore relate to a first part of the manifold 3', with the symmetrical part situated on the other side of the axis of symmetry A being identical. In these figures, the tubes 2 which are represented in FIG. 1 are not illustrated for the purpose of simplification of the figures.

In the example illustrated in FIG. 2, the manifold 3' according to the invention has a generally tubular form. It is for example of the "bipartite" type, i.e. it comprises a collector 10 and a cover 11 constituted by two distinct parts. As previously described, it additionally comprises at least one flange. This can equally be an input 8 or output 9 flange and/or another flange 35, and in the continuation of the description the flange represented in FIGS. 2 to 7b will be known as the flange 8'. A single flange 8' is represented in FIG. 2, but the manifold 3' could comprise a plurality of flanges 8', each of them crimped between the collector 10 and the cover 11. Thus, the crimping operation can make it possible to pre-assemble not only the collector 10 and the cover 11, but also the flange(s) 8'.

The collector 10 has for example a transverse cross section substantially in the form of a "U" and a wall defining a base 12 which is extended by two parallel branches or lateral wings 13, the distal ends of which delimit a longitudinal opening which is closed by the cover 11. In the base 12 of the collector 10, there are provided flattened slots 15 all along the latter, in which the corresponding ends of the parallel tubes 2 are received. These can be bordered by collars 16.

The cover 11 also has for example a transverse cross section in the form of a "U", a wall of which forms a base 21, which in particular is slightly concave, prolonged by parallel lateral branches 22 which are shorter than those of the collector 10. The dimension, particularly in width of the cover, is such that the lateral branches 22 fit head to tail between the lateral wings 13 of the collector 10.

The manifold 3' has a dimension with longitudinal extension, i.e. its length extends according to the direction o-z. Thus, the collector 10, the cover 11 and the flange 8' also have a dimension with longitudinal extension.

The assembly of the cover 11 and of the collector 10 defines an inner space 24 into which the fluid of the loop is conveyed to be circulated. As a result of the embedded form of the "Us" of the collector 10 and of the cover 11, the transverse cross section of the manifold 3' is approximately rectangular, but could be different.

Partitions, not represented, are optionally provided at each of the longitudinal ends of the manifold 3' in order to close it. Intermediate partitions, which can render the two parts of the manifold 3' hermetically sealed relative to one another can also be provided. These partitions comprise for example a stop for the positioning of the cover 11.

According to the invention, the collector 10 has ductility different from that of the flange 8' and at the level of the said flange 8', a longitudinal portion 18 of the collector 10 is rolled such that the flange 8' is blocked between the collector 10 and the cover 11.

In the example illustrated, the ductility of the collector 10 is greater than that of the flange 8', and it is therefore a longitudinal portion 18 of the collector 10 which is rolled, but a longitudinal portion of the flange 8' could also be rolled according to the invention.

The longitudinal portion 18 of the collector 10 which blocks the flange 8' and is rolled onto the latter is situated at the level of the distal end of the lateral wings 13, and extends longitudinally, i.e. in the direction o-z, along the flange 8'.

The longitudinal portion 18 which blocks the flange 8' is inclined relative to the remainder of the lateral wing 13 to which it belongs, i.e. it has an angle of inclination relative to the direction o-y according to which the lateral wings 13 extend. It is the crimping operation which provides it with this inclination, which rolls it, and which allows it to be in contact with the flange 8' in order to match a part of the surface of the flange 8', such as to block it between the collector 10 and the cover 11.

Figure 3:
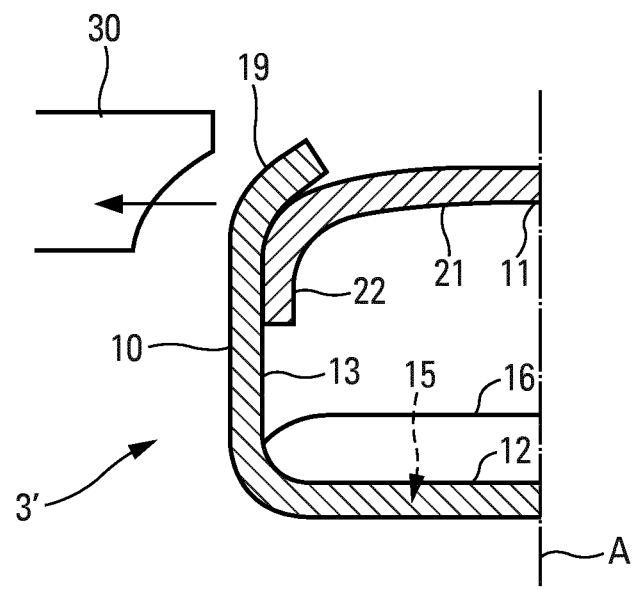
FIG. 3 is a view similar to FIG. 2, representing the manifold after crimping of the collector onto the cover, in a location without a flange, according to the line III-III in FIG. 1.

FIG. 3 is a view in cross section on a plane parallel to the plane of FIG. 2 of the same manifold 3', but in a location without a flange 8' crimped between the collector 10 and the cover 11.

The collector 10 is thus represented at the level of a longitudinal portion which defines the remainder of the length of the collector 10, known as the remaining longitudinal portion 19, i.e. the longitudinal portion onto which there is no flange 8' crimped. Just like the longitudinal portion 18 which blocks the flange 8', the remaining longitudinal portion 19 is situated at the level of the distal end of the lateral wings 13 of the collector 10.

The remaining longitudinal portion 19 is also inclined relative to the remainder of the lateral wing 13 to which it belongs, i.e. it has an angle of inclination relative to the direction o-y according to which the lateral wings 13 extend. It is the crimping operation which provides it with this inclination and which allows it to be in contact with the cover 11, in order to match a part of the surface of the cover 11, such as to block it.

Whether it is for the longitudinal portion 18 which blocks the flange 8' or the remaining longitudinal portion 19, the crimping operation is a pre-assembly operation before brazing of the elements which the manifold 3' comprises.

Figure 4:
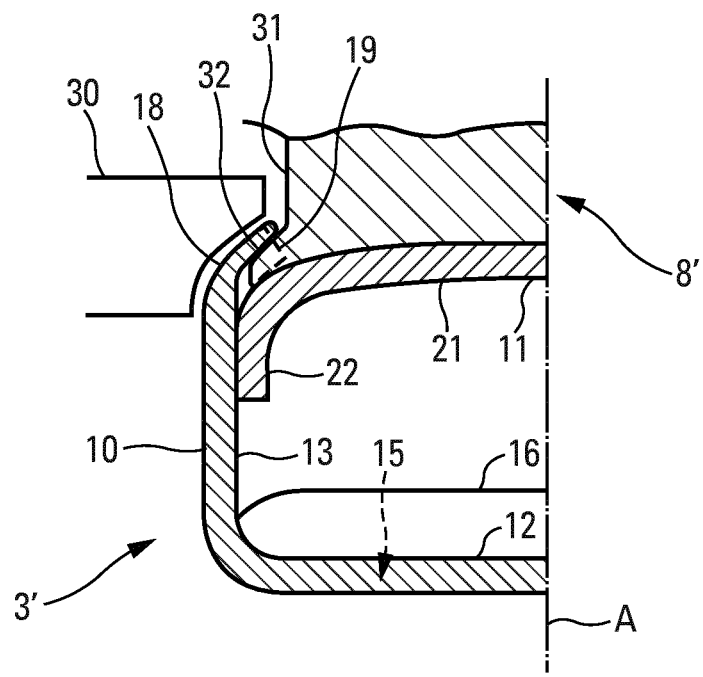
FIG. 4 is a view similar to FIG. 2, in which the collector crimped onto the cover, in the locations without a flange, is also represented in broken lines.

FIG. 4 makes it possible to illustrate the longitudinal portion 18 which blocks the flange 8' and the remaining longitudinal portion 19 in a superimposed manner. As previously stated, the longitudinal portion 18 of the collector 10 which blocks the flange 8' is rolled, and has a smaller thickness and a longer length than the remaining longitudinal portion 19 of the collector 10. On the other hand, they have an inclination identical to one another, at least at the level of the opposite surface of the cover. It can also be noticed in this figure that the longitudinal portion 18 of the collector 10 is rolled towards the flange 8', without reaching it.

As seen in FIGS. 2 and 3, this same inclination is sufficient firstly to allow the longitudinal portion 18 of the collector 10 which blocks the flange 8' to block the flange 8', and secondly to allow the remaining portion of the collector 10 to block the cover 11. It is thus possible to use a single tool profile, for example a punch 30, in order to carry out the crimping operation, so as to obtain a single inclination on the collector 10 according to its entire length.

The flange 8' comprises a central body 31 with a tubular form and a peripheral end wall, situated at an end of the flange 8' which is slightly curved such as to match the form of the base 21 and the start of the lateral wings 22 of the cover 11. The said peripheral end wall of the flange 8' has two parts which project relative to the central body 31 of the flange 8', situated opposite one another and known as the foot parts 32. A single foot part 32 is illustrated in FIGS. 2, 4, 6, 7a and 7b, and it is at least against this foot part 32 that the collector is rolled. It is in particular a portion of the lateral wings 13 which is rolled against the foot part 32.

This foot part 32 extends for example over a distance shorter than 40 mm, and in particular 20 mm, according to the dimension with longitudinal extension, i.e. according to the direction o-z.

Figure 5:
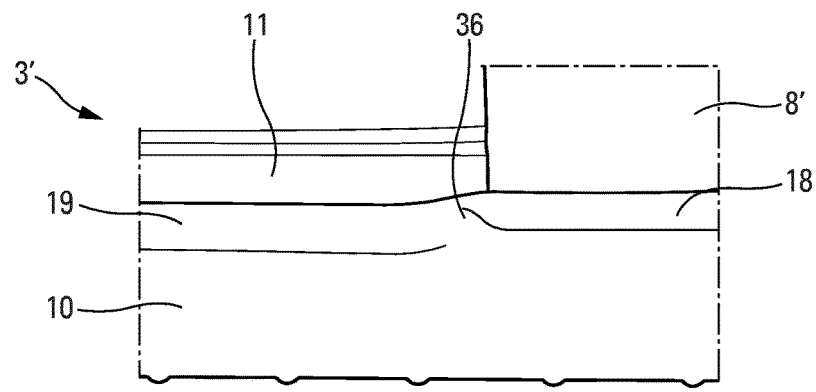
FIG. 5 is a schematic view in perspective of a manifold comprising a collector, a cover and a flange according to the invention.

FIG. 5 is a view in perspective of the manifold 3' according to the invention. It makes it possible to illustrate the longitudinal extension of the longitudinal portion 18 which blocks the flange 8' and that of the remaining longitudinal portion 19.

This figure also makes it possible to represent a connection area 36, which is slightly rolled and forms the junction between the longitudinal portion 18 which blocks the flange 8' and the remaining longitudinal portion 19.

Figure 6:
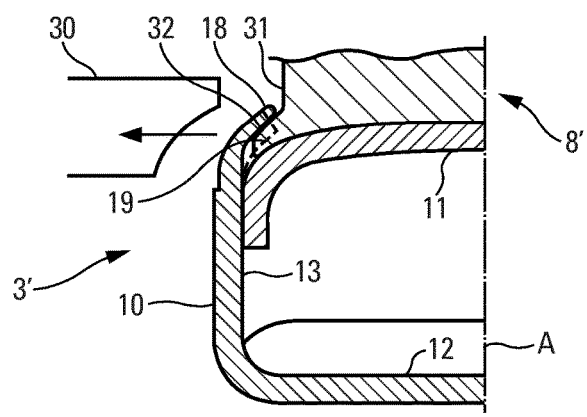
FIG. 6 is a view similar to FIG. 4, representing a variant embodiment.

FIG. 6 makes it possible to illustrate a variant of the invention according to which the lateral wings 13 have an initial thickness which is smaller than the remainder of the lateral wings 13. In other words, the lateral wings 13 have a part situated at the level of their distal ends with a thickness which is smaller than an area of the lateral wings 13 situated closer to the base 12 of the collector 10.

In this variant of the invention, it is these parts with the smaller thicknesses which are crimped and rolled at the level of the flange 8' in order to block it against the cover 11. It is also these parts with the smaller thicknesses which are crimped in order to block the cover in the locations without a flange 8'.

The manifolds according to the invention have a particular application on heat exchangers such as condensers or evaporators of an air-conditioning circuit which has, for example, the structure previously described. They can also be applied in all types of heat exchangers for motor vehicles, such as, for example, radiators for cooling of the engine, radiators for heating of the interior, exhaust gas coolers or supercharging air coolers.

Figures 7A, 7B:
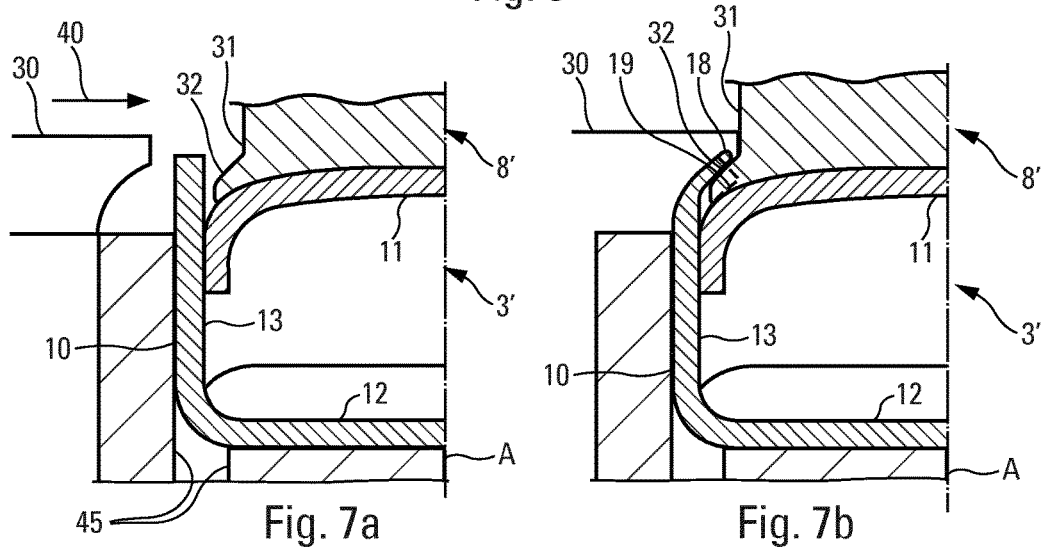
FIGS. 7a and 7b are views similar to FIG. 2, representing the manifold, positioned on a matrix, before crimping (FIG. 7a) and after crimping (FIG. 7b) of the collector onto the flange according to the invention.

As illustrated in FIGS. 7a and 7b, the invention also relates to a method for crimping a manifold 3' as previously described, comprising a collector 10 and a cover 11 with a dimension with longitudinal extension and at least one flange 8'.

The method comprises a step, represented in FIG. 7a by the arrow, reference 40, according to which the flange 8' is crimped between the collector 10 and the cover 11, and the collector 10 is crimped onto the cover 11 using a single punch profile 30, such that, as represented in FIG. 7b, the flange 8' is blocked between the collector 10 and the cover 11, and the cover 11 is blocked by the collector 10 in a single operation and with a single type of punch 30, by rolling a longitudinal part of the collector 10 and/or of the flange 8'.

In order to carry out the method, the manifold 3' is previously placed in a matrix 45. The collector 10 is in contact with the matrix 45 at the level of the outer walls of its lateral wings 13 and of its base 12. Thus, when the collector 10 is crimped onto the cover 11 and onto the flange 8', the manifold will be retained in position inside the matrix 45.

The use of the single punch profile imparts the same inclination to the longitudinal portion 18 of the collector 10 which blocks the flange 8' and to the remaining longitudinal portion 19 of the collector 10, this inclination being sufficient to block the flange 8' and the cover 11, and is obtained as a result of a single crimping operation.

It is therefore no longer necessary to use a plurality of punch profiles, or to change their position according to the presence and positioning of a flange on the manifold. It is thus possible to crimp several different models of manifold with the same punch profile.

In the examples illustrated in FIGS. 2 to 7b, and as previously described, the ductility of the collector 10 is greater than that of the flange 8'. Thus, during the crimping operation, the collector 10 is rolled. It is rolled for example towards the flange 8', and in particular towards the central body 31. Advantageously, but not exclusively, the collector 10 is rolled towards the flange 8', without reaching it.

The invention claimed is:

1. A manifold comprises a collector and a cover having a dimension with longitudinal extension and further comprises at least one flange crimped between the collector and the cover;
    wherein the collector has ductility which is greater than that of the flange;
    and wherein at the flange, a longitudinal portion of the collector has a first thickness which is smaller than a thickness of a remainder of the longitudinal portion of the collector and a first length, and at the flange, the longitudinal portion of the collector is rolled such that the longitudinal portion of the collector is tapered, has a rounded pointed terminal end, and has a second length which is longer than the first length,
    wherein the collector has a base which is a bottom portion of the collector and wherein the base of the collector has a constant thickness, and
    wherein the flange is blocked between the collector and the cover,
    wherein the flange has a foot part against which the collector is rolled, wherein the collector has lateral wings which are rolled against the foot part of the flange, and wherein the lateral wings are rolled such that the lateral wings have a free longitudinal edge with a thickness which is smaller than the remainder of the longitudinal portion of the collector, wherein the base of the collector is provided with flattened slots which are bordered by collars.

2. The manifold according to claim 1, wherein the collector has the rolled longitudinal portion blocking the flange, and has a remaining longitudinal portion which defines the remainder of the length of the collector, and wherein the cover is blocked by the remaining longitudinal portion of the collector.

3. The manifold according to claim 2, wherein the longitudinal portion of the collector which blocks the flange and the remaining longitudinal portion of the collector have a same inclination.

4. The manifold according to claim 2, wherein the longitudinal portion of the collector which blocks the flange is rolled towards the flange.

5. The manifold according to claim 1, wherein the foot part extends over a distance less than 40 mm according to a dimension with longitudinal extension.

6. The manifold according to claim 1, wherein the foot part extends over a distance equal to 20 mm according to the dimension with longitudinal extension.

7. A heat exchanger comprising the manifold according to claim 1.

8. The manifold according to claim 3, wherein the longitudinal portion of the collector which blocks the flange is rolled towards the flange.

* * * * *